United States Patent
Lee et al.

(10) Patent No.: US 9,025,884 B2
(45) Date of Patent: May 5, 2015

(54) SYSTEM AND METHOD FOR PROCESSING AN IMAGE FILE USING A COMPUTING DEVICE

(75) Inventors: Chung-I Lee, New Taipei (TW); Hai-Hong Lin, Shenzhen (CN); De-Yi Xie, Shenzhen (CN); Shuai-Jun Tao, Shenzhen (CN); Zhi-Qiang Yi, Shenzhen (CN); Jun-Chao Yao, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 221 days.

(21) Appl. No.: 13/585,768

(22) Filed: Aug. 14, 2012

(65) Prior Publication Data
US 2013/0243335 A1   Sep. 19, 2013

(30) Foreign Application Priority Data
Mar. 14, 2012   (CN) .......................... 2012 1 0066659

(51) Int. Cl.
*G06K 9/48* (2006.01)
*G06K 9/32* (2006.01)

(52) U.S. Cl.
CPC ................................. *G06K 9/3283* (2013.01)

(58) Field of Classification Search
None
See application file for complete search history.

(56) References Cited

U.S. PATENT DOCUMENTS

| | | | |
|---|---|---|---|
| 5,563,403 A * | 10/1996 | Bessho et al. ............. | 250/208.1 |
| 5,854,854 A * | 12/1998 | Cullen et al. ................. | 382/176 |
| 6,529,641 B1 * | 3/2003 | Chakraborty ................ | 382/296 |
| 2004/0101209 A1 * | 5/2004 | Tanaka .......................... | 382/275 |

* cited by examiner

*Primary Examiner* — Vu Le
*Assistant Examiner* — Alexander J Lesnick
(74) *Attorney, Agent, or Firm* — Novak Druce Connolly Bove + Quigg LLP

(57) ABSTRACT

In a method for processing an image file using a computing device, an image file from a storage system is read. If an image in the image file is slanted, an incision coordinates according to a configuration file in the storage system and a preset formula is calculated. The method incises the image using the calculated incision coordinates and storing the incised image in a new image file. If an image in the new image file is not slanted, the method further determines whether the image has been incised. If the image has been incised, the method records the calculated incision coordinates that make the image not be slanted as optimal incision coordinates, and stores the optimal incision coordinates into a database.

15 Claims, 3 Drawing Sheets

SYSTEM AND METHOD FOR PROCESSING AN IMAGE FILE USING A COMPUTING DEVICE

BACKGROUND

1. Technical Field

Embodiments of the present disclosure relate to file management technology, and more particularly to a system and method for processing an image file using a computing device.

2. Description of Related Art

Most paper documents need are manually scanned where images of the paper documents are processed using a computing device or other electronic devices. However, the resulting scanned images may be slanted (e.g., at an angle or offset) because of inaccurate scanning operations on the paper documents. If an image is slanted, characters on the image cannot be parsed accurately, or errors may occur when parsing the slanted image. For example, optical character recognition (OCR) software cannot extract the characters from the slanted image correctly.

DETAILED DESCRIPTION

Figure 1:
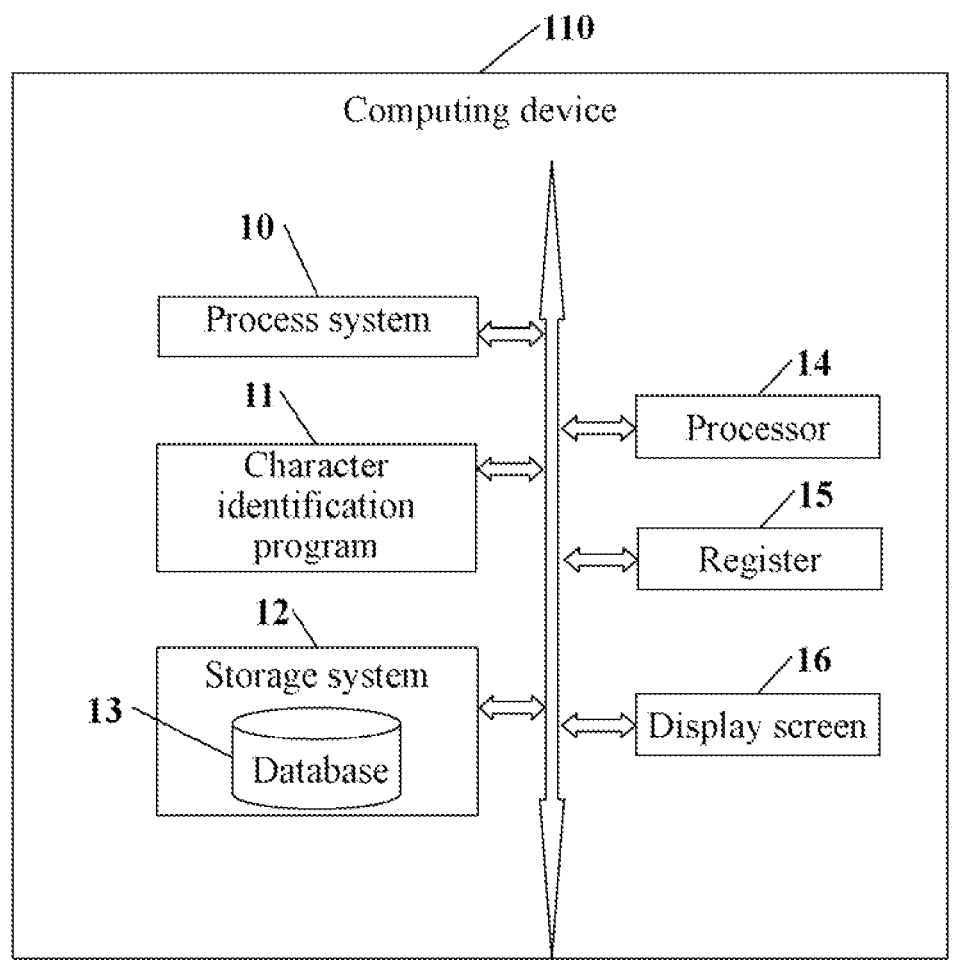
FIG. 1 is a block diagram of one embodiment of a computing device including a process system.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used herein refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-ray disks, flash memory, and hard disk drives.

FIG. 1 is a block diagram of one embodiment of a computing device 1 including a process system 10. The computing device 1 further includes character identification program 11, a storage system 12, at least one processor 14, a register 15, and a display screen 16. The character identification program 11 may process an image file, identify and extract characters of an image in an image file. The storage system 12 stores a plurality of image files of the computing device 1. The image in the image file includes characters (text). For example, the image file may be a signature, or a receipt. In one embodiment, the character identification program 11 may be optical character recognition (OCR) software. The process system 10 processes a slanted image in the image file to better extract characters in the slanted image.

The storage system 12 further stores a configuration file of the process system 10. The configuration file stores incision parameters of the process system 10, such as, initial incision coordinates and initial increment coordinates, for example. The initial incision coordinates can be set as (X=20, Y=30) and initial increment coordinates can be set as (Xi=5, Yi=5) according to practical experiences. The incision parameters also can be modified according to user requirements. After the process system 10 processes a plurality of image files, the process system 10 may update the incision parameters to improve efficiency and success rate of processing the image files. The storage system 12 further includes a database 13 for storing coordinates data recorded by the process system 10.

The at least one processor 14 executes one or more computerized codes and other applications of the computing device 1, to provide functions of the process system 10. In some embodiments, the register 15 may be a small amount storage area for storing data of the computing device 1, and the register 15 can be read and written. In one embodiment, the register 15 includes a sign bit, and a first preset value (e.g. 0) or a second preset value (e.g. 1) can be written to the sign bit. The display screen 16 displays data of the computing device 1.

Figure 2:
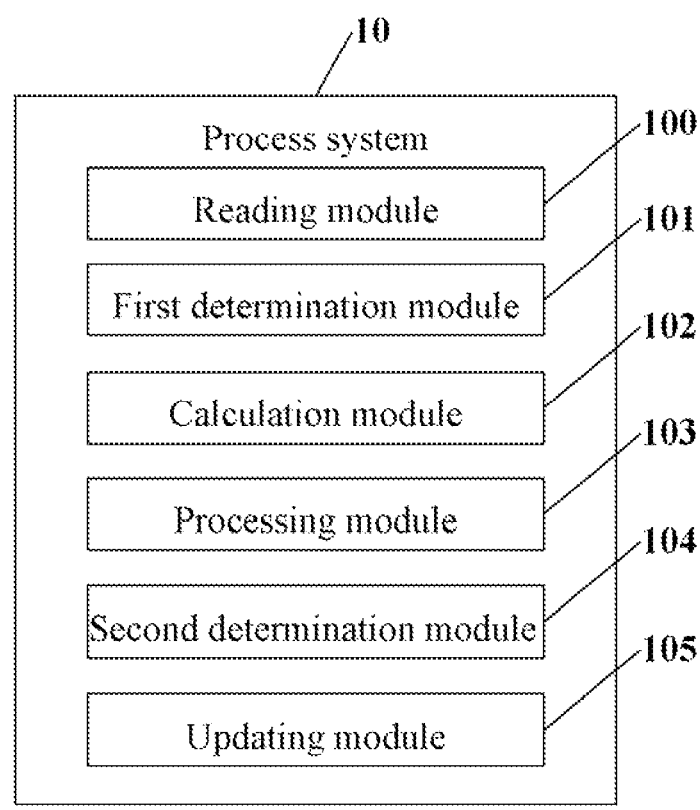
FIG. 2 is a block diagram of function modules of a process system included in the computing device of FIG. 1.

FIG. 2 is a block diagram of function modules of the process system 10 included in the computing device of FIG. 1. In the embodiment, the process system 10 may include a reading module 100, a first determination module 101, a calculation module 102, a processing module 103, a second determination module 104, and an updating module 105. The modules 100-105 comprise computerized codes in the window of one or more programs that are stored in the storage system 12. The computerized codes include instructions that are executed by the at least one processor 14 to provide functions for the modules. Details of each of the modules will be given in FIG. 3.

Figure 3:
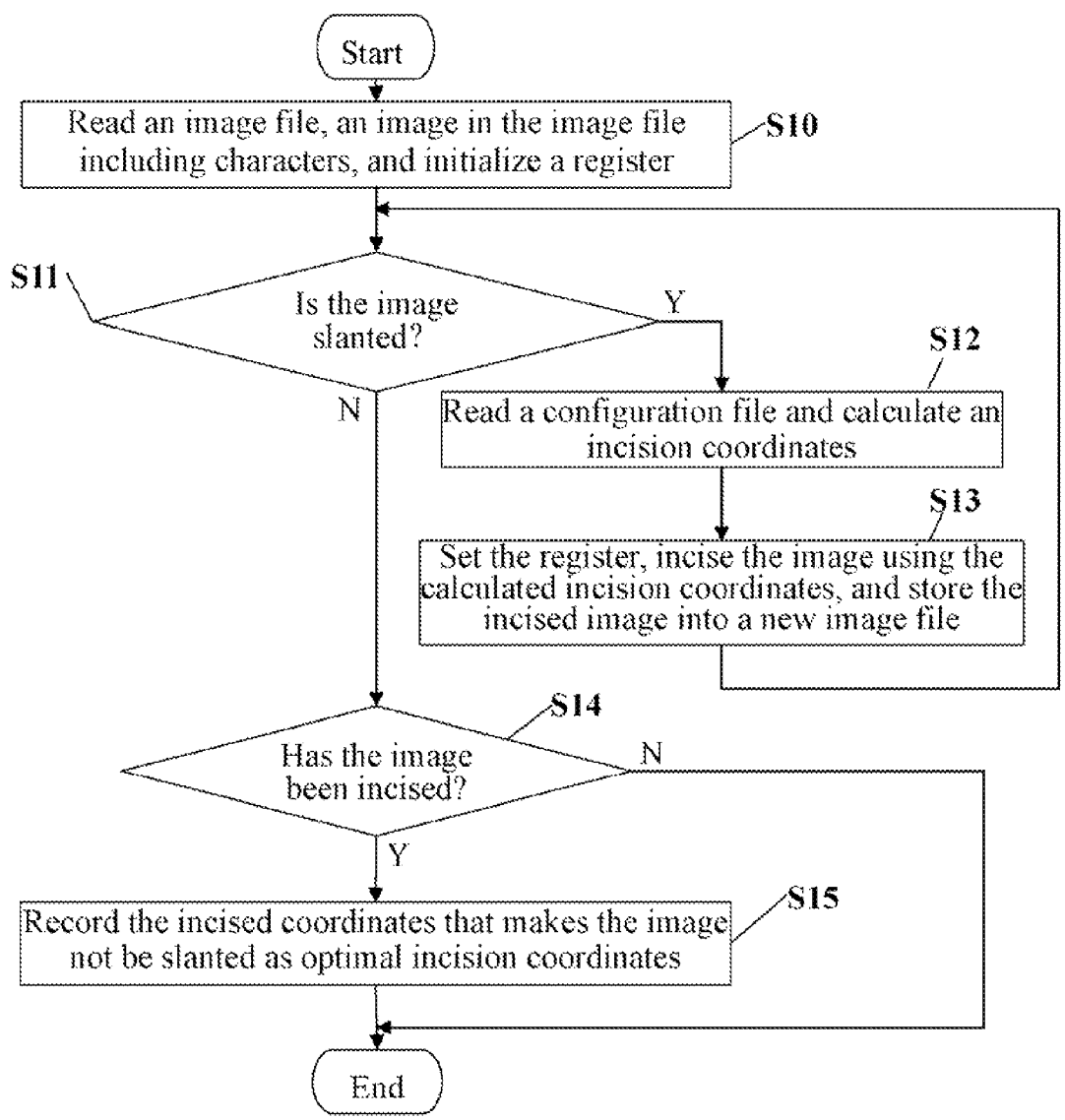
FIG. 3 is a flowchart of one embodiment of a method for processing an image file using the computing device of FIG. 1.

FIG. 3 is a flowchart of one embodiment of a method for processing an image file using the computing device of FIG. 1. Depending on the embodiment, additional steps may be added, others deleted, and the ordering of the steps may be changed.

In step S10, the reading module 100 reads an image file from the storage system 12, and initializes the register 15. The reading module 100 initializes the register 15 by writing the first preset value to the sign bit of the register 15.

In step S11, the first determination module 101 determines whether an image in the image file is slanted. In one embodiment, the first determination module 101 sends the image file to the character identification program 11. If the character identification program 11 does not extract any characters from the image in the image file, the first determination module 101 determines that the image in the image file is slanted, and step S12 is implemented. If the character identification program 11 extracts one or more characters from the image in the image file, the first determination module 101 determines that the image in the image file is not slanted, and step S14 is implemented.

In other embodiments, the first determination module 101 may display a popup window including a message of "Is the image slanted or not?" on the display screen 16, and offer two choices "yes" or "no". If the choice "yes" is selected, the determination module 101 determines that the image in the image file is slanted. If the choice "no" is selected, the determination module 101 determines that the image in the image file is not slanted.

In step S12, the calculation module 102 reads the configuration file from the storage system 12, and calculates incision coordinates of the image according to a predetermined formula and the incision parameters in the configuration file. In one embodiment, the predetermined formula is "incision coordinates=initial incision coordinates+initial increment coordinates*(cycle number−1)". The incision coordinates "(Xc, Yc)" are calculated by "Xc=X+Xi*(cycle number−1) and Yc=Y+Yi*(cycle number−1)". In some embodiments, the cycle number is an integer, and is greater than or equal to 1, such as, 1, 2, 3, . . . , and an initial value of the cycle number is 1. The cycle number may be initialized to be 1 when the image file is read from the storage system 12.

For example, if the image in the image file is determined to be slanted, according to the initial incision coordinates of (X=20, Y=30), the initial increment coordinates of (Xi=5, Yi=5), and the cycle number of 1, the calculation module 102 calculates the incision coordinates to be (Xc=20, Yc=30). After the calculation module 102 uses the cycle number of 1 to calculate the incision coordinates, the calculation module 102 records the cycle number of 1 for the calculated incision coordinates.

In step S13, the processing module 103 sets the register 15, incises the image in the image file according to the calculated incision coordinates, stores the incised image in a new image file, and returns to step S11 for determining whether the image in the new image file is slanted. In one embodiment, the processing module 103 sets the calculated incision coordinates as coordinates of an upper left corner vertex of the incised image to incise the image in the image file. The processing module 103 sets the register 15 by writing the second preset value to the sign bit of the register 15.

It should be noted that, if the image in the image file is incised by the calculated incision coordinates, the processing module 103 stores the incised image in a first new image file, and the determination module 101 determines whether the image in the first new image file is slanted. If the image in the first new image file is slanted, the calculation module 102 recalculates the incision coordinates by increasing the cycle number by one. The calculation module 102 records the increased cycle number of the recalculated incision coordinates. The processing module 103 incises the image in the first new image file according the recalculated incision coordinates and stores the incised image in a second new image file for replacing the first new image file. Then, the procedure returns to step S11 to further determine if the image in the second new image file is slanted, and steps S12-S13 are repeated until the image in the new image file is not slanted.

In step S14, the second determination module 104 determines whether the image in the image file has been incised according the value of the sign bit of the register 15. The image file may be the image file or may be the new image file. If the value of the sign bit is equal to the first preset value, the second determination module 104 determines that the image has not been incised, that is, the image file is the image file, and the procedure ends. If the value of the sign bit is equal to the second preset value, the second determination module 104 determines that the image has been incised, that is, the image file is the new image file, and step S15 is implemented.

In step S15, the updating module 105 records the incision coordinates that make the incised image not be slanted as optimal incision coordinates, and stores the optimal incision coordinates into the database 13 of the storage system 12. In one embodiment, if a number of the optimal incision coordinates in the database exceeds a preset number (e.g. 200), the updating module 105 may update the configuration file in the storage system 12 according to the optimal incision coordinates stored in the database 13. The updating module 105 updates the configuration file by extracting first optimal incision coordinates having highest frequencies in the database 13 to replace the original incision coordinates in the configuration file. The updating module further calculates difference coordinates between the first optimal incision coordinates and second optimal incision coordinates having the second highest frequencies in the database 13, and replaces the initial increment coordinates by a half of the difference coordinates.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for processing an image file using a computing device, the method comprising:
    (a) reading an image file from a storage system of the computing device;
    (b) determining whether an image in the image file is slanted, the image in the image file comprising one or more characters;
    (c) when the image is determined to be slanted, calculating an incision coordinates of the image according to initial incision coordinate and initial increment coordinates in a predetermined configuration file stored in the storage system and a preset formula, ending the method when the image is determined to be not slanted;
    (d) incising the image using the calculated incision coordinates and storing the incised image in a new image file, and determining whether the incised image in the new image file is slanted;
    (e) when the incised image is determined to be slanted, calculating an incision coordinates of the incised image and returning to (d), and when the incised image is determined to be not slanted, recording the calculated incision coordinates corresponding to the incised image as optimal incision coordinates and storing the optimal incision coordinates into the storage system;
    (f) when a number of the optimal incision coordinates in the storage system exceeds a preset number, updating the predetermined configuration file by extracting first optimal incision coordinates having the highest frequencies in the storage system to replace the original incision coordinates in the predetermined configuration file, and calculating difference coordinates between the first optimal incision coordinates and second optimal incision coordinates having the second highest frequencies in the storage system, and replacing the initial increment coordinates by a half of the difference coordinates.

2. The method according to claim 1, wherein the step (b) comprises:
    sending the image file or the new image file to a character identification program in the computing device;

determining that the image in the image file or the incised image in the new image file is not slanted when the character identification program extracts one or more characters from the image in the image file or from the incised image in the new image file; or determining that the image in the image file or the incised image in the new image file is slanted when the character identification program does not extract any character from the image in the image file or the incised image in the new image file.

3. The method according to claim 1, wherein the step (a) further comprises initializing a register in the computing device by writing a first preset value into the register, and the step (d) further comprises setting the register by writing a second preset value into the register.

4. The method according to claim 3, further comprising:
reading a value in the register;
determining that the image has not been incised upon the condition that the read value is equal to the first preset value; or
determining that the image has been incised upon the condition that the read value is equal to the second preset value.

5. The method according to claim 1, further comprising:
calculating the incision coordinates using the preset formula of "incision coordinates=initial incision coordinates+initial increment coordinates*(cycle number−1)", and recording a cycle number, an initial value of the cycle number being equal to 1;
incising the image in the image file using the calculated incision coordinates, and storing the incised image in a first new image file;
recalculating the incision coordinates by increasing the cycle number by one and recording the increased cycle number of the recalculated incision coordinates, when the incised image in the first new image file is determined to be slanted;
incising the incised image in the first new image file using the recalculated incision coordinates, and storing the incised image in a second new image file for replacing the first new image file;
repeating the step of "recalculating the incision coordinates by increasing the cycle number by one" until the incised image incised by the recalculated incision coordinates is determined not to be slanted.

6. A non-transitory storage medium storing a set of instructions, when executed by at least one processor of a computing device, cause the at least one processor to perform a method for processing an image file to cause the computing device to:
(a) read an image file from a storage system of the computing device;
(b) determine whether an image in the image file is slanted, the image in the image file comprising one or more characters;
(c) when the image is determined to be slanted, calculate incision coordinates of the image according to initial incision coordinates and initial increment coordinates in a predetermined configuration file stored in the storage system and a preset formula, ending the method when the image is determined to be not slanted;
(d) incise the image using the calculated incision coordinates and storing the incised image in a new image file, and determine whether the incised image in the new image file is slanted;
(e) when the incised image is determined to be slanted, calculate an incision coordinates of the incised image and implement step (d), and when the incised image is determined to be not slanted, record the calculated incision coordinates corresponding to the incised image as optimal incision coordinates and store the optimal incision coordinates into the storage system;
(f) when a number of the optimal incision coordinates in the storage system exceeds a preset number, update the predetermined configuration file by extracting first optimal incision coordinates having highest frequencies in the storage system to replace the original incision coordinates in the predetermined configuration file, and calculate difference coordinates between the first optimal incision coordinates and second optimal incision coordinates having the second highest frequencies in the storage system, and replace the initial increment coordinates by a half of the difference coordinates.

7. The non-transitory storage medium according to claim 6, wherein the step (b) comprises:
sending the image file or the new image file to a character identification program in the computing device;
determining that the image in the image file or the incised image in the new image file is not slanted when the character identification program extracts one or more characters from the image in the image file or from the incised image in the new image file; or
determining that the image in the image file or the incised image in the new image file is slanted when the character identification program does not extract any character from the image in the image file or the incised image in the new image file.

8. The non-transitory storage medium according to claim 6, wherein the step (a) further comprises initializing a register in the computing device by writing a first preset value into the register, and the step (d) further comprises setting the register by writing a second preset value into the register.

9. The non-transitory storage medium according to claim 8, wherein the method further comprises:
reading a value in the register;
determining that the image has not been incised upon the condition that the read value is equal to the first preset value; or
determining that the image has been incised upon the condition that the read value is equal to the second preset value.

10. The non-transitory storage medium according to claim 6, further comprising:
calculating the incision coordinates using the preset formula of "incision coordinates=initial incision coordinates+initial increment coordinates*(cycle number−1)", and recording a cycle number, an initial value of the cycle number being equal to 1;
incising the image in the image file using the calculated incision coordinates, and storing the incised image in a first new image file,
recalculating the incision coordinates by increasing the cycle number by one and recording the increased cycle number of the recalculated incision coordinates, if the incised image in the first new image file is determined to be slanted;
incising the incised image in the first new image file using the recalculated incision coordinates, and storing the incised image in a second new image file for replacing the first new image file;
repeating the step of "recalculating the incision coordinates by increasing the cycle number by one" until the incised image incised by the recalculated incision coordinates is determined not to be slanted.

11. A computing device, comprising:
a storage system;
at least one processor; and
one or more programs that are stored in the storage system and executed by the at least one processor, the one or more programs comprising:
a reading module that reads an image file from the storage system;
a first determination module that determines whether an image in the image file is slanted, the image in the image file comprising one or more characters;
a calculation module that calculates an incision coordinates of the image according to initial incision coordinates and initial increment coordinates in a predetermined configuration file stored in the storage system and a preset formula, upon the condition that the image is determined to be slanted;
a processing module that incise the image using the calculated incision coordinates and storing the incised image in a new image file;
the first determination module further determines whether the incised image in the new image file is slanted;
the calculation module further calculates an incision coordinates of the incised image when the when the incised image is determined to be slanted;
an updating module that records the calculated incision coordinates that make the image not be slanted as optimal incision coordinates and stores the optimal incision coordinates into the storage system, when the incised image is determined to be not slanted; and
the updating module further updates the predetermined configuration file in the storage system if a number of the optimal incision coordinates in the storage system exceeds a preset number, and the updating module updating the predetermined configuration file by extracting first optimal incision coordinates having highest frequencies in the storage system to replace the original incision coordinates in the predetermined configuration file, calculating difference coordinates between the first optimal incision coordinates and second optimal incision coordinates having the second highest frequencies in the storage system, and replacing the initial increment coordinates by a half of the difference coordinates.

12. The computing device according to claim 11, wherein the first determination module sends the image file or the new image file to a character identification program in the computing device, and determines that the image in the image file or the incised image in the new image file is not slanted when the character identification program extracts the one or more characters from the image in the image file or from the incised image in the new image file; or determines that the image in the image file or the incised image in the new image file is slanted when the character identification program does not extract any character from the image in the image file or the incised image in the new image file.

13. The computing device according to claim 11, wherein the reading module further initializes a register in the computing device by writing a first preset value into the register, and the processing module further sets the register by writing a second preset value into the register.

14. The computing device according to claim 13, wherein the one or more programs further comprises a second determination module that reads a value in the register, and determines that the image has not been incised if the read value is equal to the first preset value, or determines that the image has been incised upon if the read value is equal to the second preset value.

15. The computing device according to claim 11, wherein the calculation module calculates the incision coordinates using the preset formula of "incision coordinates=initial incision coordinates+initial increment coordinates*(cycle number−1)", and records a cycle number, an initial value of the cycle number being equal to 1;
the processing module incises the image in the image file using the calculated incision coordinates, and stores the incised image in a first new image file,
the calculation module recalculates the incision coordinates by increasing the cycle number by one and recording the increased cycle number of the recalculated incision coordinates, if the incised image in the first new image file is determined to be slanted;
the processing module further incises the image in the first new image file using the recalculated incision coordinates, and stores the incised image in a second new image file for replacing the first new image file;
the first determination module further determines that the incised image in the second new image file the slanted.

* * * * *